(12) United States Patent
Chi et al.

(10) Patent No.: US 7,043,103 B2
(45) Date of Patent: May 9, 2006

(54) SELF-HEALING FIBER BRAGG GRATING SENSOR SYSTEM

(75) Inventors: Sien Chi, Hsinchu (TW); Peng-Chun Peng, Zhonghe (TW); Wen-Piao Lin, Changhua (TW)

(73) Assignee: National Chiao Tung University, Hsinchu (TW)

( * ) Notice: Subject to any disclaimer, the term of this patent is extended or adjusted under 35 U.S.C. 154(b) by 8 days.

(21) Appl. No.: 10/838,193

(22) Filed: May 5, 2004

(65) Prior Publication Data

US 2005/0249448 A1    Nov. 10, 2005

(51) Int. Cl.
*G02B 6/00* (2006.01)

(52) U.S. Cl. .......................................... 385/12; 385/37

(58) Field of Classification Search ................... 385/12, 385/37

See application file for complete search history.

(56) References Cited

U.S. PATENT DOCUMENTS 6,281,998 B1 * 8/2001 Jones et al. ..................... 398/9
6,865,344 B1 * 3/2005 Johnson et al. ............... 398/77

* cited by examiner

*Primary Examiner*—Jennifer Doan
(74) *Attorney, Agent, or Firm*—Troxell Law Office, PLLC (57) ABSTRACT

The present invention is a self-healing fiber Bragg grating sensor system which comprises a central office, at least one network node, at least one 2×2 optical switch and at least one fiber Bragg grating. The network node can be made of optical switch. When the fiber for the sensor system is broken, sensing signals are discriminated in different paths provided by the network nodes to avoid stop working once the fiber is broken, by which the self-healing ability of the system is greatly improved. Besides, by using the structure of fiber laser in the present invention, the power output and the signal-to-noise ratio can be greatly increased. Accordingly, the present invention is to design a fiber sensor system with low cost and high capacity and with capability of self-healing.

7 Claims, 8 Drawing Sheets

SELF-HEALING FIBER BRAGG GRATING SENSOR SYSTEM

FIELD OF INVENTION

The present invention relates to a self-healing fiber Bragg grating sensor system; more particularly, relates to that, when the fiber is broken, the ability of self-healing can be greatly improved with a star-bus-ring architecture; and the capacity of system sensing is effectively enhanced by time-sharing multitasking.

DESCRIPTION OF PRIOR ART

The technology of fiber Bragg grating has progressed a lot during the past years. The various outer stresses are applied to the fiber Bragg grating that causes the reflectivity of the Bragg wavelengths to vary. So that the sensors made with such an optical element for engineering measurements are becoming increasingly important.

M. A. Davis et al, "Interrogation of 60 fibre Bragg grating sensors with microstrain resolution capability," in *Electronics Letters*, vol. 32, pp. 1393–1394, 1996, that disclose the 1×4 and 1×2 optical switch was applied to increase the capacity of the fiber sensor to 60 points where the sensing amount was increased by time-sharing multitasking. Though the sensing amount can be increased by doing so, the fiber sensor is set on the same fiber so that the system can not be fixed easily when the fiber is broken.

A. D. Kersey et al, "Fiber grating sensors," in journal of Lightwave Technology, vol. 15, pp. 1442–1463, 1997, that disclose using fiber sensors to a star or tree network, the capacity of the fiber sensor system could be increased. But, under these two network structure, no light path is available to discriminate the sensing signal when the fiber is broken.

V. Montoya et al, "Improved double-fiber-bus with distributed optical amplification for wavelength-division multiplexing of photonic sensors", in IEEE Photonics Technology Letters, vol. 12, pp. 1270–1272, 2000, that disclose setting fiber sensors to a bus network, the sensing amount of the fiber could be increased. But, how to repair the system once the fiber is broken is still unsolved.

P. C. Peng et al, "A novel fiber-laser-based sensor network with self-healing function," in IEEE Photonics Technology Letters, vol. 15, pp. 275–277, 2003 that disclose setting fiber sensors to a ring network, self-healing ability could be achieved. But, when there are more than two breakpoints on the fiber, it is still impossible for the system to do self-healing.

On considering the above-mentioned prior arts, common traditional fiber Bragg grating sensor system measures the variation of the reflection spectrum by the input of a wide bandwidth light source into a fiber Bragg grating. The number of the sensors positioned in a wavelength division multiplex is limited by the bandwidth and the power of the wide bandwidth light source. And, it is still not designed in such a fiber sensor system on how to repair the system by itself once the fiber is broken or the component is spoiled.

BRIEF DESCRIPTION OF INVENTION

Therefore, the main purpose of the present invention is to change the topology of the sensors. By using a star-bus-ring architecture, the self healing ability of the system can be greatly improved.

Another purpose of the present invention is to make the system be capable of self healing and the sensing amount can be increased by time-sharing multitasking.

The third purpose of the present invention is to develop a sensor system of fiber laser that has the advantages of high power output and high signal-to-noise ratio for sensing a big region or a region in a long distance.

To achieve the above purpose, the present invention is a self-healing fiber Bragg grating sensor system which comprises a central office to provide a light source and to discriminate the sensing signals, at least one network node each connected with the central office to protect the network, at least one 2×2 optical switch between the network nodes to control light path for time-sharing multitasking, and at least one fiber Bragg grating connected with the 2×2 optical switches, wherein the capability of self-healing is greatly improved by using a star-bus-ring architecture when the fiber is broken; and wherein the capacity for system sensor is effectively enhanced by time-sharing multitasking.

BRIEF DESCRIPTION OF THE DRAWINGS

The present invention will be better understood from the following detailed description of preferred embodiments of the invention, taken in conjunction with the accompanying drawings, in which.

DESCRIPTION OF PREFERRED EMBODIMENT

The following descriptions of the preferred embodiment are provided to understand the features and the structures of the present invention.

Figure 1:
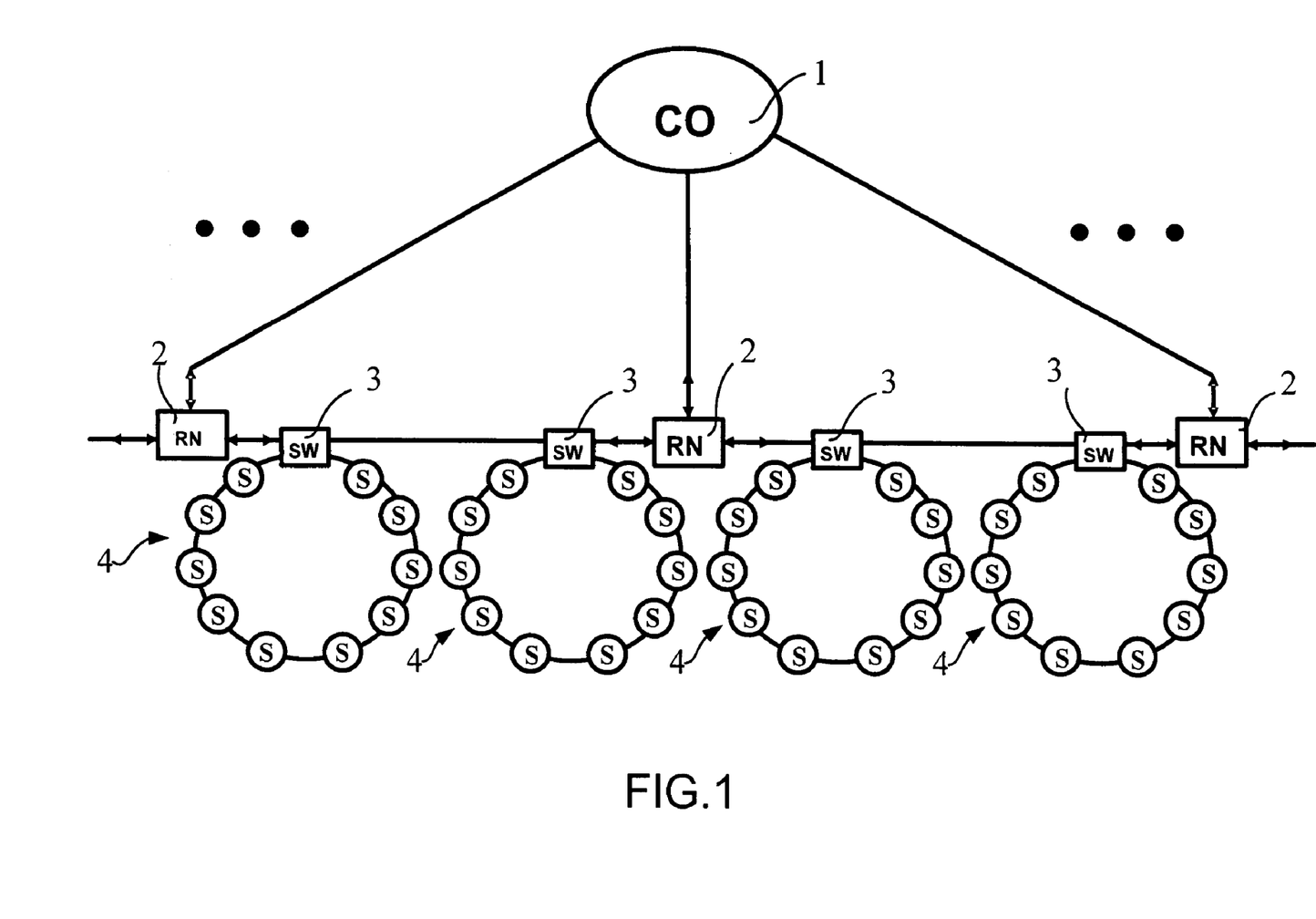
FIG. 1 is a diagram of the self-healing fiber Bragg grating sensor system according to the present invention.
Figure 7:
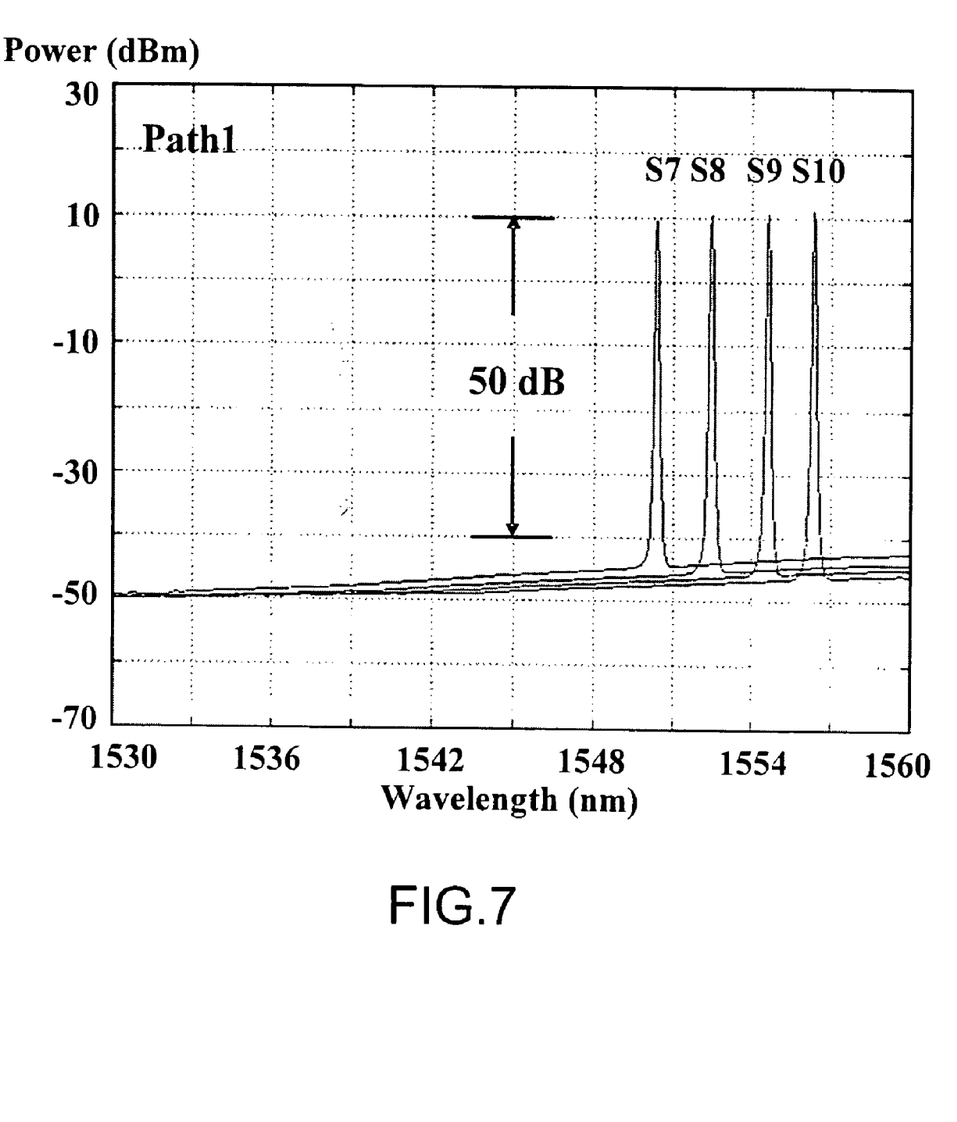
FIG. 7 is a view showing the signal path between S7 and S10 scanned by the tunable filter on path 1 according to the present invention when there is a breakpoint between S6 and S7.
Figure 8:
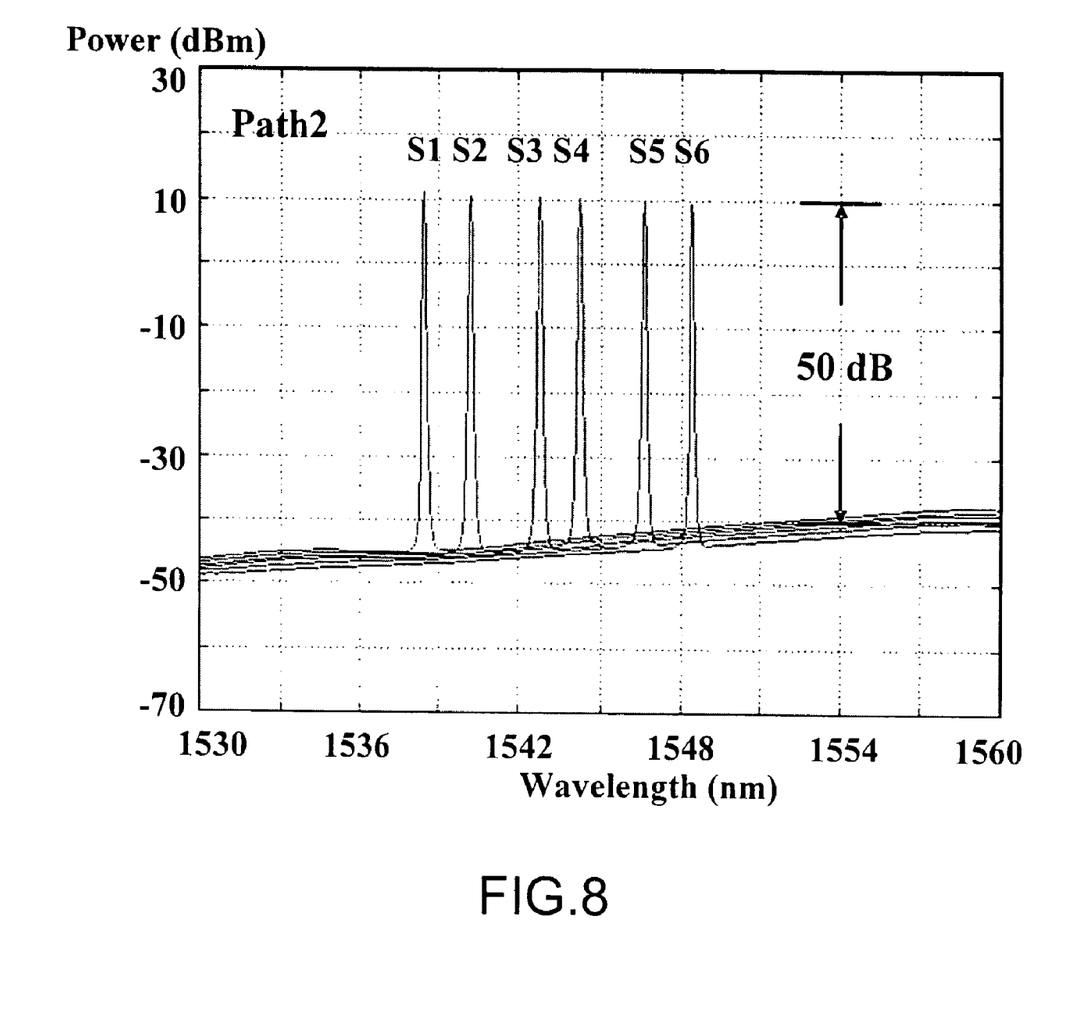
FIG. 8 is a view showing the signal path between S1 and S6 scanned by the tunable filter on path 2 according to the present invention.

Please refer to FIG. 1 till FIG. 8, which are a diagram of the self-healing fiber Bragg grating sensor system, a structure diagram of the network nodes, a diagram showing the path on scanning the sensing region, a view showing the status of the bus network when the fiber is broken, a view showing the status of the star network when the fiber is broken, a view showing the experiment of testing the fiber sensor system, a view showing the signal path between S7 and S10 scanned by the tunable filter on path 1 when there is a breakpoint between S6 and S7, and a view showing the signal path between S1 and S6 scanned by the tunable filter on path 2, according to the present invention. As shown in the figures, the present invention is a self-healing fiber Bragg grating sensor system which comprises a central office 1, at least one network nodes 2, at least one 2×2 fiber switch 3 and at least one fiber Bragg grating, wherein the capability of self-healing is greatly improved by using a star-bus-ring architecture once the fiber is broken and the capacity for system sensor is effectively enhanced by time-sharing multitasking.

Figure 2:
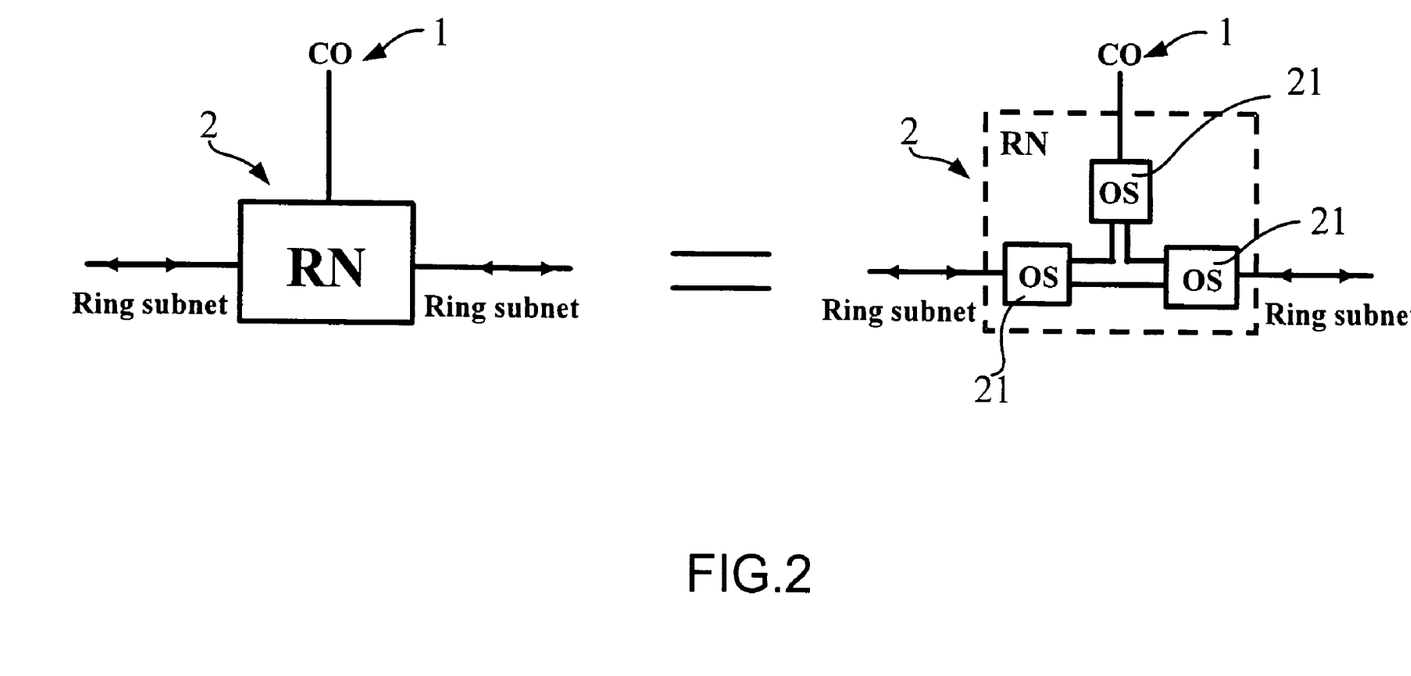
FIG. 2 is a structure diagram of the network nodes according to the present invention.

Please refer to FIG. 1 and FIG. 2, wherein the central office is to provide light source and to discriminate the sensing signal.

The at least one network node 2 is connected with the central office 1 and comprises at least one 1×2 optical switch 21.

The at least one 2×2 optical switch 3 is between network nodes 2 to control light path for time-sharing multitasking.

The at least one fiber Bragg grating 4 is connected with the 2×2 optical switch 3 in a star-bus-ring architecture for time-sharing multitasking. Accordingly, a novel self-healing fiber Bragg grating sensor system is constructed.

Figure 3:
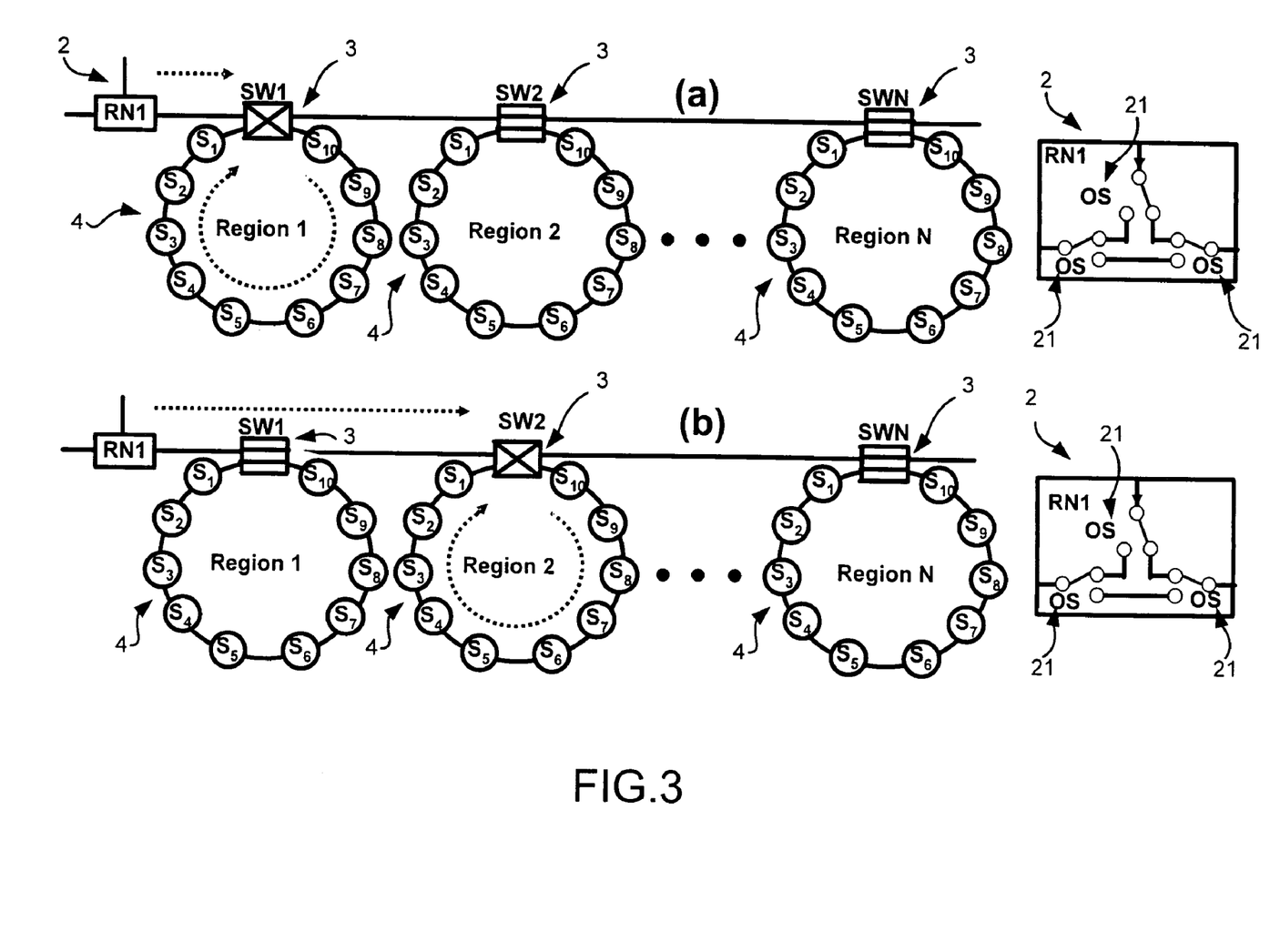
FIG. 3 is a diagram showing the path for scanning the sensing region according to the present invention.
Figure 4:
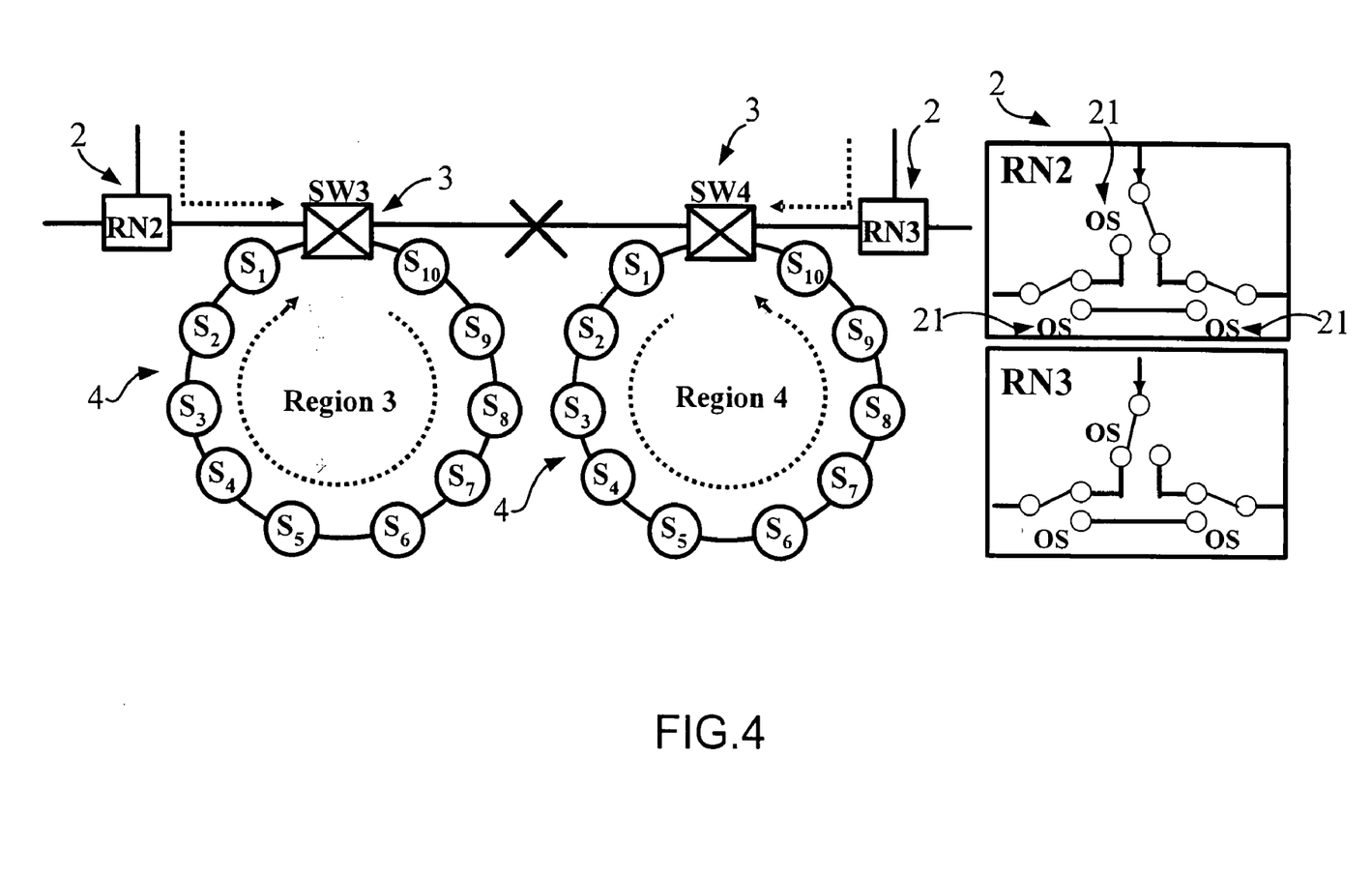
FIG. 4 is a view showing the status of the bus network according to the present invention when the fiber is broken.

Please refer to FIG. 3, which is a view showing a bus network structure for time-sharing multitasking according to the present invention. Therein, Sm (subscript m is from 1 to 10) are fiber Bragg gratings 4 with different wavelengths. The dotted line is the diagram of the light path. The (a) diagram is the light path diagram when scanning the sensing region 1. The (b) diagram is the light path diagram when scanning the sensing region 2. As shown in the FIG. 4, it is a view showing the status of a bus network structure when the fiber is broken. When the fiber is broken, the present invention can still discriminate the sensing signal of the region 3 and that of the region 4 by network nodes 2.

Figure 5:
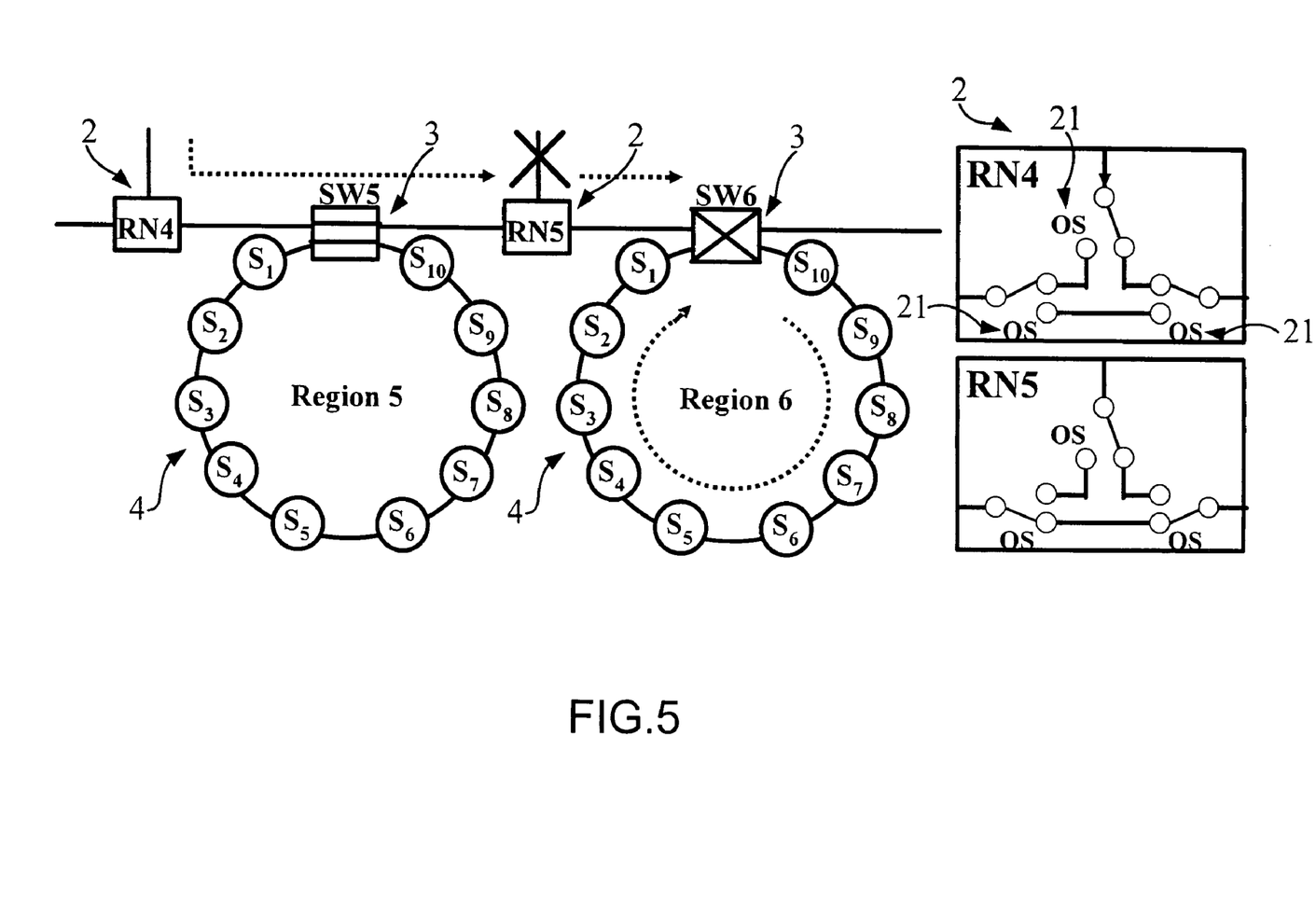
FIG. 5 is a view showing the status of the star network according to the present invention when the fiber is broken.
Figure 6:
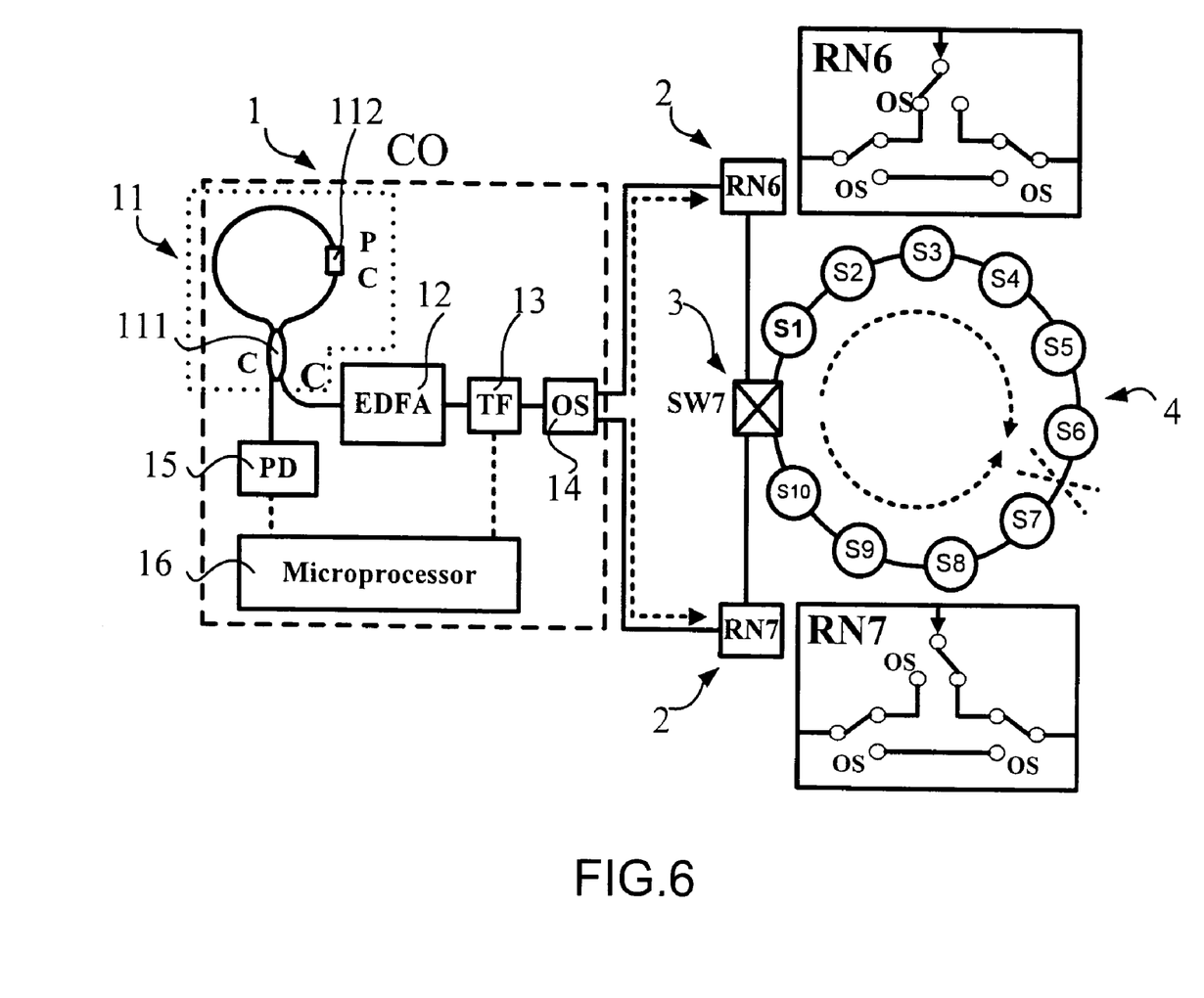
FIG. 6 is a view showing the experiment of testing the fiber sensor system according to the present invention.

FIG. 5 is a view showing that, when the fiber for a star network structure is broken, a new path will be rearranged by the network nodes 2. Therefore, the present invention prevents system from stop working when the fiber is broken.

Because the use of a plurality of optical switches in a network would reduce the power and the signal-to-noise ratio of the sensing signal, the central office 1 of the present invention increases the strength of the signal by fiber laser structure. As shown in the FIG. 6, the central office 1 comprises a fiber speculum 11, a fiber amplifier 12 connected with the fiber speculum 11, a tunable filter 13 connected with the fiber amplifier 12, a 1×2 optical switch 14 (which can further be a 1×N optical switch) connected with the tunable filter 13, a photo detector 15 connected with the fiber speculum 11, and a microprocessor-based controller 16 connected with the tunable filter 13 and the photo detector 15. Therein, the fiber speculum 11 comprises a 2×2 optical coupler 111 and an optical polarization controller 112. The reflection rate of the fiber speculum 11 can be adjusted by the optical polarization controller 112. The fiber amplifier 12 is an erbium-doped fiber amplifier. When the wavelength of the tunable filter 13 is coherent with that of the fiber Bragg grating 4, laser signal will be output to the photo detector 15 so that the sensing signal can be acquired by the wavelength of the laser signal output. The wavelengths of the fiber Bragg grating 4 for S1 to S10 are 1538.58, 1540.14, 1542.81, 1544.28, 1546.65, 1548.42, 1550.43, 1552.38, 1554.39, 1556.37 nm. FIG. 7 is a view showing the signal between S7 and S10 scanned by the tunable filter on path 1 when there is a breakpoint between S6 and S7. FIG. 8 is a view showing the signal between S1 and S6 scanned by adjusting the tunable filter on path 2. Therefore, the feasibility of the system is approved by FIG. 7 and FIG. 8.

To sum up, the present invention is a self-healing fiber Bragg grating sensor system that can effectively mend the defects of the related art. The self-healing fiber Bragg grating sensor system can greatly enhance the self-healing ability by a star-bus-ring architecture when the fiber is broken. And, by time-sharing multitasking the capacity of system sensing can be further enhanced.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A self-healing fiber Bragg grating sensor system, comprising:
   a central office to provide a light source and to discriminate the sensing signals,
   at least one network node each connected with said central office to protect the network;
   at least one 2×2 optical switch between said network nodes to control light path for time-sharing multitasking; and
   at least one fiber Bragg grating connected with said 2×2 optical switches,
   wherein said central office comprises a fiber speculum, a fiber amplifier connected with said fiber speculum, a tunable filter connected with said fiber amplifier, a 1×N optical switch connected with said tunable filter, a photo detector connected with said fiber speculum, and a microprocessor-based controller connected with said tunable filter and said photo detector.

2. The self-healing fiber Bragg grating sensor system according to claim 1, wherein said fiber speculum comprises a 2×2 optical coupler and an optical polarization control unit.

3. The self-healing fiber Bragg grating sensor system according to claim 1, wherein said fiber amplifier is an erbium-doped fiber amplifier.

4. The self-healing fiber Bragg grating sensor system according to claim 1, wherein said network node comprises at least one 1×2 optical switch.

5. The self-healing fiber Bragg grating sensor system according to claim 1, wherein said fiber Bragg grating is connected with said 2×2 optical switches to form a star network structure for time-sharing multitasking.

6. The self-healing fiber Bragg grating sensor system according to claim 1, wherein said fiber Bragg grating is connected with said 2×2 optical switches to form a bus network structure for time-sharing multitasking.

7. The self-healing fiber Bragg grating sensor system according to claim 1, wherein said fiber Bragg grating is connected with said 2×2 optical switches to form a ring network structure for time-sharing multitasking.

* * * * *